United States Patent [19]

Currey

[11] 3,823,899
[45] July 16, 1974

[54] ACTUATION SYSTEM FOR ANGULARLY POSITIONING AIRCRAFT LANDING GEAR WHEELS

[75] Inventor: Norman S. Currey, Atlanta, Ga.

[73] Assignee: Lockheed Aircraft Corporation, Burbank, Calif.

[22] Filed: Oct. 20, 1972

[21] Appl. No.: 299,406

[52] U.S. Cl. .................................. 244/103 W
[51] Int. Cl. .................................. B64c 25/50
[58] Field of Search. 244/103 W, 103 R, 50, 100 R, 244/102 R; 180/79.2 A, 79.2 C; 280/91, 93; 340/26

[56] References Cited
UNITED STATES PATENTS

| | | | |
|---|---|---|---|
| 2,512,979 | 6/1950 | Strother | 180/79.2 C |
| 3,007,655 | 11/1961 | Criswell et al. | 244/50 |
| 3,070,336 | 12/1962 | Lear, Sr. | 244/103 R |
| 3,532,178 | 10/1970 | Lindbom | 180/79.2 C |
| 3,633,701 | 1/1972 | Le Tourneau et al. | 244/50 X |

Primary Examiner—Trygve M. Blix
Assistant Examiner—Paul E. Sauberer
Attorney, Agent, or Firm—Billy G. Corber; John J. Sullivan

[57] ABSTRACT

This device positions an airplane's landing gear wheels to a selected angle from the straight-ahead position relative to the longitudinal line of the aircraft or the direction of movement to compensate for crosswind landing and take-off. It comprises an axle for each such wheel, which axle is pivoted about a vertically oriented pin so that when the several axles are rotated by actuator means the desired wheel angle is effected. Such actuator means may be a linear type, pushing or pulling a bellcrank arm made as part of the axle, or it may be a rotary type turning about the vertical axis.

2 Claims, 4 Drawing Figures

ACTUATION SYSTEM FOR ANGULARLY POSITIONING AIRCRAFT LANDING GEAR WHEELS

This invention relates to landing gear for aircraft and more particularly to an actuation system to position the surface contacting elements of each landing gear assembly relative to the landing strip or runway to compensate for aircraft attitude during take-off and landing operations as occasioned by crosswinds acting on and against the aircraft.

In order to cope with, i.e., compensate for, crosswinds during the landing and take-off operations of aircraft, the pilot normally side-slips or yaws the aircraft. This disposes the several landing gear wheels in an angular position relative to the long dimension of the runway or landing strip. For example, when landing, prior to touchdown, the pilot must correct this angularity and concurrently level the aircraft, which is referred to as "flaring," i.e., he must "flare" the aircraft. Otherwise, tip-over conditions may be generated, and/or undue loads may be imposed on the landing gear, i.e., on the several elements thereof such as the tires, wheels, and/or struts resulting in damage to the aircraft.

In addition, the flare maneuver is important in that it determines the total length of runway required for the landing operation of the aircraft. This is important regardless of the particular type of aircraft under consideration but is critical in short take-off and landing type aircraft, usually referred to as "STOL" aircraft.

In STOL aircraft operations, the glide slope in landing is about twice that of the more convenient type of aircraft. The total runway length is determined by the flare distance plus the ground run. Therefore, the pilot is required to accomplish his flare in a minimum distance.

The present invention contemplates improvements in aircraft performance during the flare operation by simultaneously simplifying the pilot's task in assuring the level attitude of the aricraft and also the runway alignment of the landing gear surface contacting elements, e.g., the wheels at touchdown. Generally speaking, this is accomplished by simultaneously rotating the several landing gear wheels by an angle equal to, and in the opposite direction from, the aircraft yaw. Thus, the wheels all remain aligned with the long dimension of the runway while the attitude of the aircraft is turned or cocked with its wing into the airstream direction or into the "wind" as it is called and lowered with the nose down. At touchdown, the pilot need only be concerned with leveling the aircraft.

The broad idea of prepositioning landing gear wheels on aircraft is not novel. This has been heretofore proposed in order to facilitate the retraction and storage of the gear during flight. It has also been employed during landing to assure true fore and aft position of the wheels with respect to the longitudinal dimension of the aircraft, for example, to minimize impact loads and tire wear.

The novelty of the present invention resides in a pilot-controlled drive mechanism to rotate all of the wheels of an aircraft in unison in the horizontal plane to a precise angular position equal to and opposite from that of the aircraft yaw. This operation of the drive mechanism is monitored and the polot informed. When located in the desired angular position, special means is provided to assure that the drive mechanism is retained in this position without vibration or shimmy. As an additional safety measure an overriding control monitors the angular adjustment of wheels on opposite sides of the aircraft and automatically operates to deactivate the drive mechanism if and when the wheels reach a predetermined condition of asymmetry.

The actuation system herein contemplated is equally effective for take-off and landing operations. In either case, it permits the landing gear wheels to remain constantly aligned with the runway length during aircraft yaw to counteract the effects of crosswinds acting on the aircraft.

With the above and other objects in view as will be apparent, this invention consists in the construction, combination, and arrangement of parts all as hereinafter more clearly described, claimed, and illustrated in the accompanying drawings, wherein:

Figure 2:
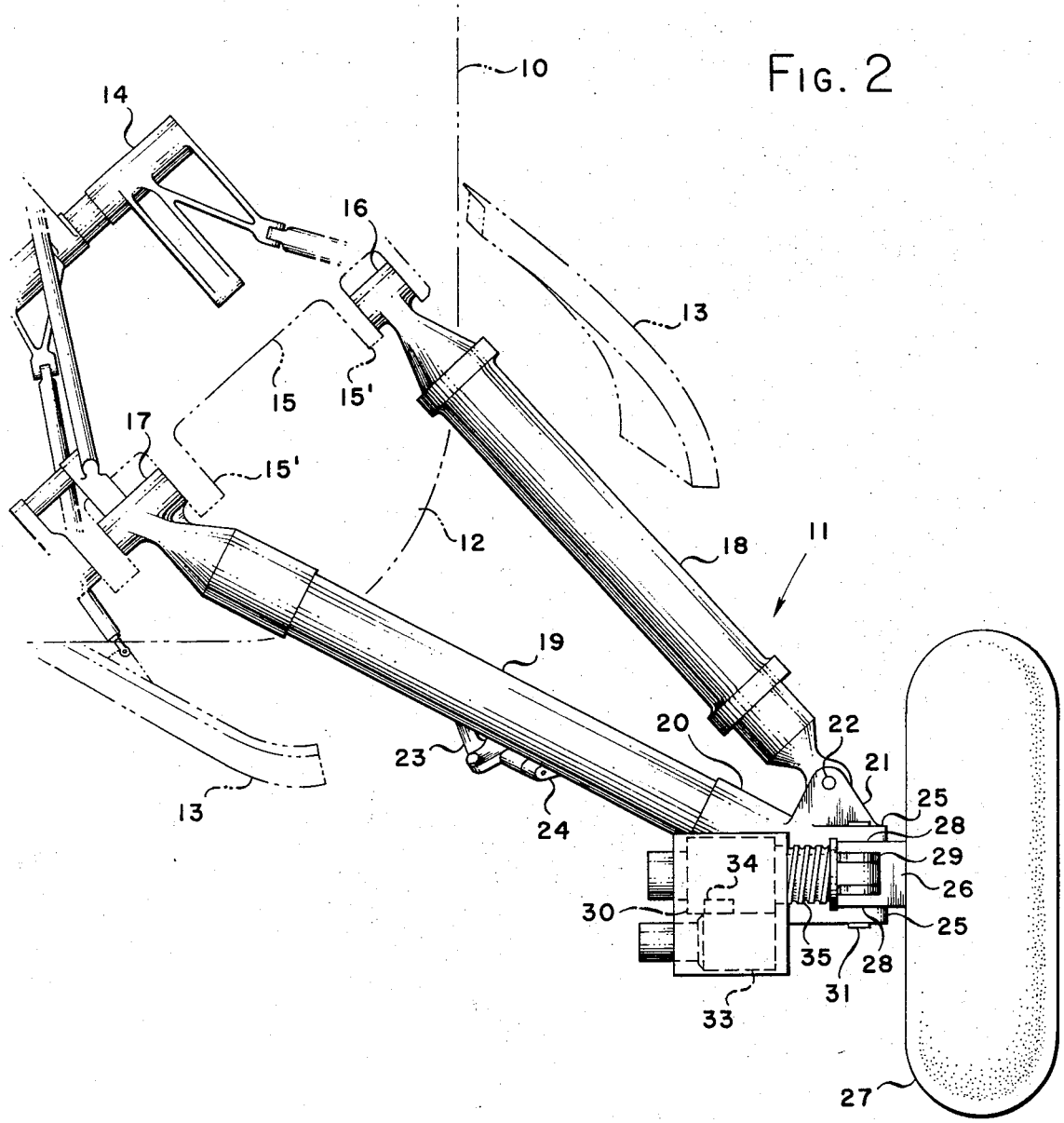
FIG. 2 is a front view of one of the main landing gear units of the aircraft illustrated in FIG. 1 to show primarily the drive mechanism to rotate the wheel in the horizontal plane relative to the long dimension of the aircraft, the associated part of the aircraft being illustrated in phantom lines.
Figure 3:
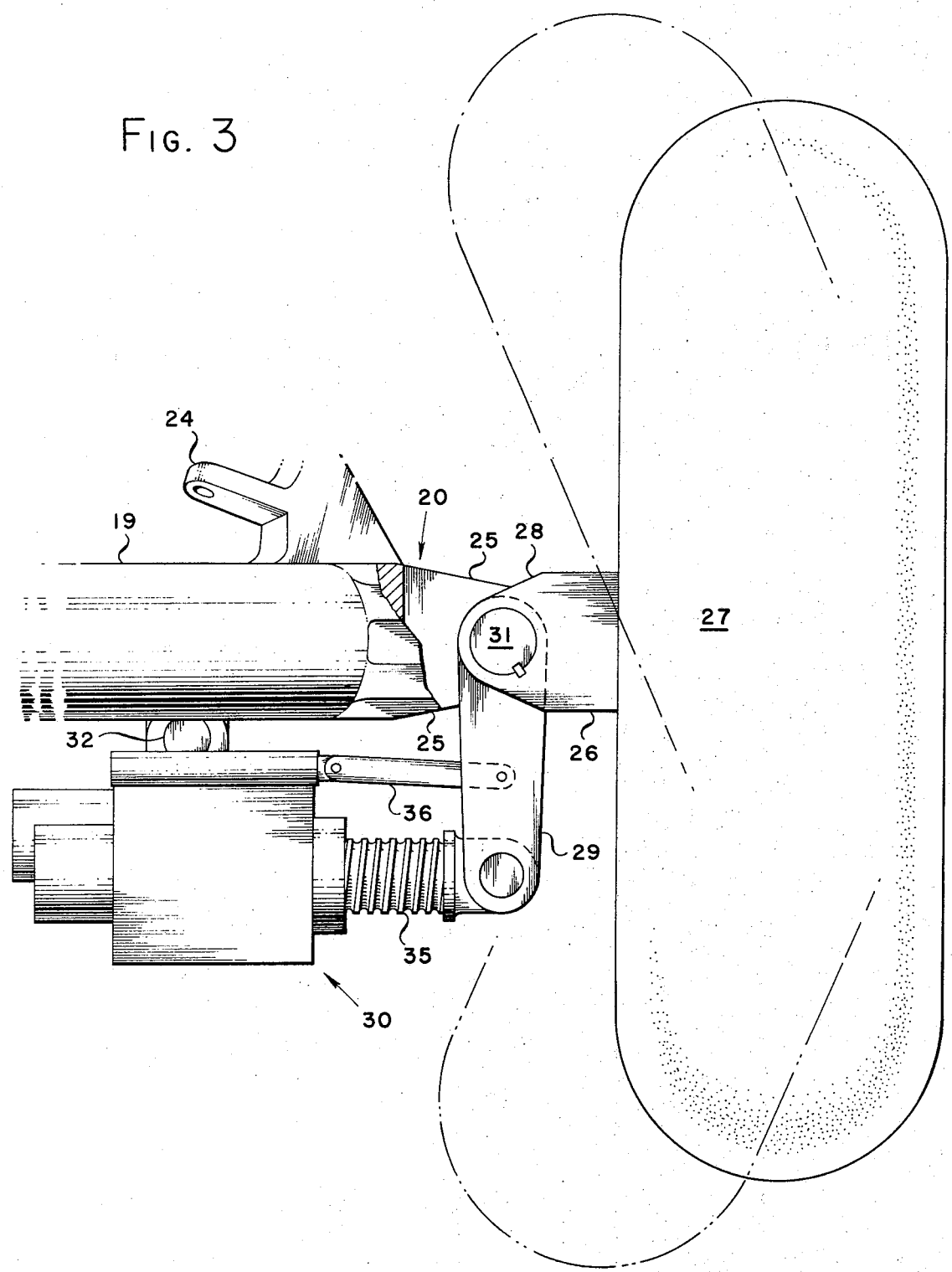
Figure 4:
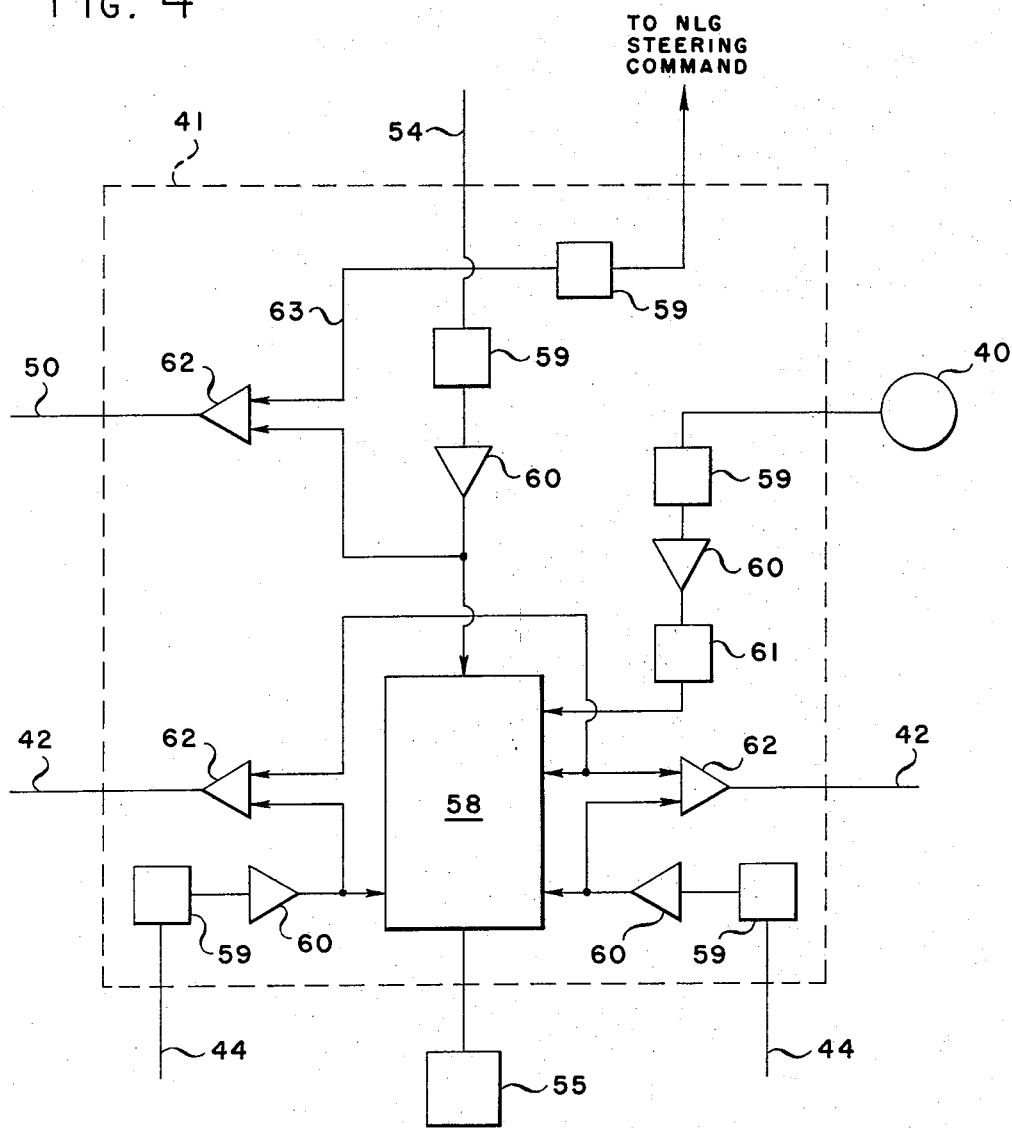

FIG. 3 is a plan view of the same landing gear unit illustrated in FIG. 2 and additionally indicating in broken lines the extreme positions of angular adjustment of the wheel relative to the true fore and aft position; and FIG. 4 is a block diagram of the control device to coordinate the angular adjustment of the several wheels and to de-activate the drive mechanism in the event of an asymmetric condition.

Referring more particularly to the drawings, 10 designates a component of an aircraft such as, for example, the fuselage or the equivalent in which the several landing gear assemblies including each main landing gear unit 11 is mounted for extension and retraction. In order to permit this, the wall of the fuselage 10 is provided with an opening 12 which is adapted to be closed by doors 13 which are hinged thereto. When in the closed position, the external surfaces of the doors 13 form a smooth and uninterrupted continuation of the external surface of the fuselage 10 so as to present an aerodynamically clean body. These doors 13 are actuated by appropriate, conventional mechanism (not shown) including the necessary linkage designated collectively as 14 to rotate them to and from their extreme positions and permit the extension and retraction of the associated landing gear unit 11.

Each main landing gear unit 11 is mounted for rotation on fixed structure 15 internally of the fuselage 10 providing projecting ears 15' to accommodate trunnions 16 and 17 at the respective extremities of a shock strut 18 and a tension strut 19. The tension strut 19 is of fixed length and terminates at its outer end in a mount 20 formed or otherwise provided with an ear 21 to which the outer end of the shock strut 18 is pivotally connected as at 22. The shock strut 18 is of variable length comprised of telescoping cylinders as commonly employed. Suitable linkage designated generally as 23 and actuating mechanism (not shown) is provided between the tension strut 19 where it pivotally connects to an ear 24 carried thereby and the interior of the aircraft 10 to swing the landing gear unit 11 to and from the extended and retracted positions.

The mount 20 terminates in a bifurcation 25 adapted to receive an axle 26 to which the landing gear wheel 27 is attached in conventional manner. The end of the axle 26 is also bifurcated as at 28 to accommodate the extremity of a link 29, the opposite end of which is pivotally connected to the linearly adjustable end of a screw jack 30. The overlapping ends of the bifurcations, 25 and 28 are all pierced transversely to accommodate a bolt 31 whereby the wheel 27 is rotatable in the horizontal plane, i.e., capable of angular deflection as best illustrated in FIG. 3.

The other end of the screw jack 30 is secured to the tension strut 19 by means of and through a pivotal connection 32 whereby it is carried by such strut 19 but is capable of swinging relative thereto. The screw jack 30 is of conventional design comprising in essence a motor 33 to rotatably drive a nut 34 in which the threaded screw 35 is linearly adjusted by rotation of such nut 34 in a fixed position. The link 29 acts as a bellcrank lever with the wheel axle 26 whereby adjustment of the length of the screw 35 causes an angular adjustment of the wheel 27.

A reciprocable rod 36 telescopically mounted between the screw jack 30 and the link 29 extends and retracts accordingly upon operation of the screw jack 30 constituting a linear displacement detection device. At its inner end this rod 36 operatively connects to a position transmitter in the form of a linear voltage displacement transducer 37 which in turn electrically connects through an appropriate conductor 38 to a remote readout or indicator 39 located in the cockpit of the aircraft 10. Thus, the degree of angular deflection of the associated wheel 27 is indicated for view by the pilot or operator.

Figure 1:
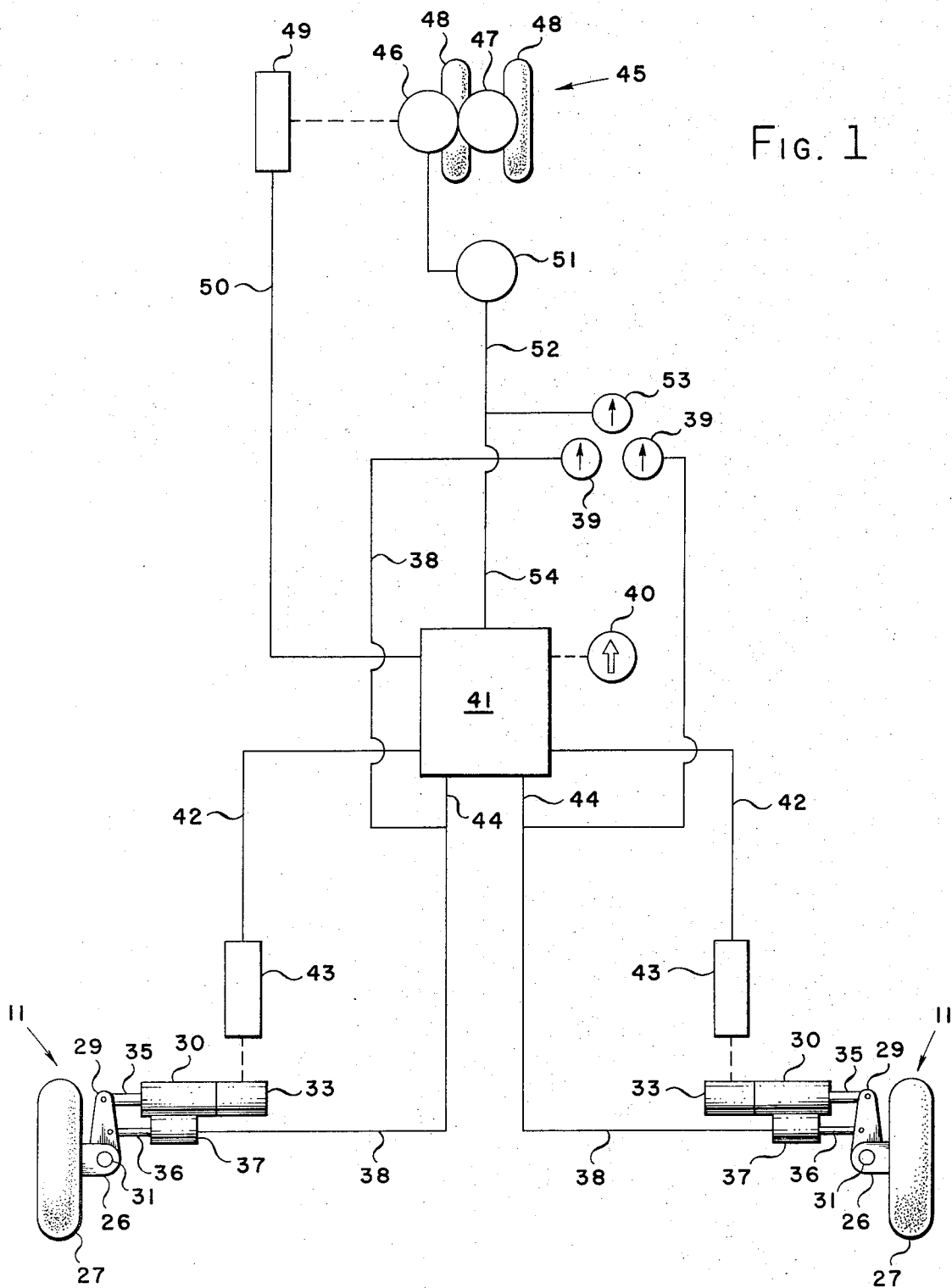
FIG. 1 is a schematic view of an actuation system designed and constructed in accordance with the teachings of this invention as applied to an aircraft having a tricycle landing gear to show primarily the overall arrangement of parts and their interconnection and relationship one with the other.

FIG. 1 shows an application of each main landing gear unit 11, as above described, to a tricycle arrangement as commonly employed in aircraft. Within the control cabin or cockpit of the aircraft is located the control lever or knob 40 of a control unit 41 connected to the motor 33 of each main landing gear unit 11 through a conductor 42. An electro-hydraulic valve 43 is employed between the control unit 41 and each motor 33 to regulate the hydraulic pressure and, therefore, the operation of the motors 33 whereby the wheels 27 on each side of the aircraft are angularly deflected in unison to and from the fore and aft position. Operation of the transducer 37, associated with each wheel 27, as above described, transmits a signal through the associated conductor 38 to register such movement on the corresponding indicator 39 within the cockpit. This transducer signal is also fed to the control unit 41 through each line 44 to terminate the operation thereof when the angular position of the associated wheel 27 has reached that to which it has been set by the knob 40.

The foregoing arrangement and operation of the main landing gear units 11 may be coordinated with the nose gear unit 45 by means of and through its integration with the steering system thereof. Typical of such a steering system is an actuator 46 operatively connected to the nose gear unit 45 to rotate its strut 47 in either direction to angularly deflect the wheel or wheels 48 thereof accordingly. An electrohydraulic valve 49 is employed to regulate the hydraulic pressure of the actuator 46 as well as the effective direction thereof and hence the angular deflection of the wheels 48.

Operation of this steering system is integrated with the main landing gear system as above described by connection of the valve 49 through a conductor 50 to the control unit 41 for its operation simultaneously with that of the main landing gear units 11. A position transmitter 51 the full equivalent of transducers 37 measures such movement of the wheels 48 and passes corresponding signals through line 52 to an indicator 53 in the cockpit adjacent the indicators 39. These signals are also fed into the control unit 41 through line 54 to terminate the operation thereof when the wheels 48 have reached the position of angular deflection set by adjustment of the knob 40.

FIG. 4 shows the general arrangement of parts included in the control unit 41 which serve to integrate the operation of the main landing gears 11 and the nose landing gear 45 whereby the wheels 27 and 48 of all these are angularly adjusted in unison. At the same time, this unit 41 detects an asymmetric condition in excess of some predetermined angle, e.g., on the order of 5°. Upon attainment of such condition the power employed to move the several wheels 27 and 48 is turned off and the system becomes inoperative. This event is indicated to the pilot or operator, e.g., by means of and through a light 55 or equivalent signal.

To the above ends, the control unit incorporates a voltage comparator 58 operatively connected to each transducer 37 and 51 as well as to each valve 43 and 49 associated with the main landing gears 11 and nose landing gear 45, respectively. A demodulator 59 to convert the AC signal from the transducer 37 to a DC signal which may or may not be phase sensitive and a buffer 60 to amplify the DC signal and isolate a signal from its ultimate load device may be incorporated in each line 44 to the monitor 41.

A similar demodulator 59 and buffer 60 may be employed in the line between the control knob 40 and the comparator 58. If desired or required, a rate limiter 61 may also be incorporated in this line to establish the rate of change at some predetermined value, either incrementally or continuously.

The control unit 41 also includes a servo amplifier 62 in each line 42 to the comparator 58 from each main landing gear valve 43 and in the line 50 from the nose gear valve 49. Each amplifier 62 serves to drive the associated valve 43 and 49 and includes an input for position and rate feedback.

The control unit 41 is integrated in the airplane steering system as illustrated simply in FIG. 4. This is effected by connecting the pilot's control lever, i.e., the command, through a conductor or line 63 to the electrohydraulic valve 49 associated with the nose landing gear wheel 45. A demodulator 59, the full equivalent of those previously described, is included in the line 63 to convert the AC signal to DC.

In view of the foregoing, when the knob 40 is rotated the actuator 46 in the steering system mechanism moves the nose gear 45 accordingly. This is effected through the valve 49 which includes a hydraulic block to restrain the gear 45 in the adjusted position when reached. The position transmitter 51 sends signals to both main gear valves 43 which direct hydraulic pressure to the associated motor 33 on each crosswind actuator 30 to thereby drive the respective wheels 27 to the corresponding angle. When this signal is satisfied the wheels 27 are held in position by a hydraulic block.

In order to return the several wheels 27 and 45 back to normal, i.e., true fore and aft, referred to as "washout," the knob 40 is rotated to zero. All wheels 27 and 45 are thereby driven to neutral while nose gear steering by handwheel or rudder pedal, as the case may be, is available to maintain direction.

The comparator or asymmetry monitor 58 coordinates the signals received from each main gear wheel 27 and the nose gear wheel 45. Whenever a hydraulic, electrical or mechanical malfunction causes any wheel 27 or 45 to be more than the preselected degree, e.g., 5°, misaligned relative to the others then the operation of the control unit 41 is stopped. The cockpit light 55 shows crosswind inoperative and indicators 39 and 53 reveal which landing gear wheel is faulty. If desired, a reset switch may be employed to continue wheel positioning at the pilot's discretion.

What is claimed is:

1. In an aircraft having a tricycle landing gear arrangement consisting of a pair of main wheel units and a nose wheel unit, an actuation system for the angular adjustment of said several wheel units relative to the long dimension of said aircraft comprising:

a pilot's control lever;

a hydraulic drive actuator operatively connected to each of said main and nose wheel units for the rotation thereof in the horizontal plane, the drive actuators of each main wheel unit including a screwjack and a bellcrank connection between the end of said screwjack and its associated main wheel unit;

an electrohydraulic valve connected between each said drive actuator and said pilot's control lever;

a linear voltage displacement transducer operatively connected to each said drive actuator;

an indicator visible to the pilot connected to each said transducer and operative to register the angular adjustment of each of said main and nose wheel units at all times; and a control unit interposed between said pilot's control lever and all of said electrohydraulic valves and operative upon movement of said control lever to concurrently operate said valves and thereby energize said actuators whereby said main and nose wheel units are angularly adjusted equally and in unison, said control unit including a servo amplifier individual to each said valve and a comparator operatively connected to all of said transducers and between said pilot's control lever and said valves, said comparator being operative to de-energize said control unit upon an asymmetric operation of said drive actuators in excess of a predetermined amount.

2. The actuation system of claim 1 wherein said predetermined amount of asymmetric operation is equal to a misalignment corresponding to approximately a 5° angle of one wheel unit relative to another.

* * * * *